United States Patent [19]

Herzig et al.

[11] Patent Number: 5,760,145
[45] Date of Patent: Jun. 2, 1998

[54] CROSSLINKABLE COMPOSITIONS COMPRISING ORGANOPOLYSILOXANES CONTAINING ALIPHATICALLY UNSATURATED HYDROCARBON RADICALS

[75] Inventors: Christian Herzig, Waging am See, Germany; David Huettner, Tecumseh; Kathy Beckel, Adrian, both of Mich.

[73] Assignee: Wacker-Chemie GmbH, Germany

[21] Appl. No.: 882,841

[22] Filed: Jun. 26, 1997

[30] Foreign Application Priority Data

Jul. 4, 1996 [DE] Germany ............... 196 27 022.7

[51] Int. Cl.⁶ ........................... C08G 77/08
[52] U.S. Cl. ........................... 525/478; 528/15; 528/31; 528/32; 428/447
[58] Field of Search ........................... 528/15, 31, 32; 525/478; 428/447

[56] References Cited

U.S. PATENT DOCUMENTS

| | | | |
|---|---|---|---|
| 3,445,420 | 5/1969 | Kookootsedes et al. | 260/37 |
| 3,775,452 | 11/1973 | Karstedt | 260/429 R |
| 4,772,515 | 9/1988 | Hara et al. | 428/447 |
| 5,077,369 | 12/1991 | De Montigny et al. | 528/15 |
| 5,082,515 | 1/1992 | Hara et al. | 528/15 |
| 5,087,720 | 2/1992 | Kishita et al. | 556/434 |
| 5,581,008 | 12/1996 | Kobayashi | 556/434 |

FOREIGN PATENT DOCUMENTS

| | | |
|---|---|---|
| 0110370 | 4/1987 | European Pat. Off. |
| 0403890 | 3/1994 | European Pat. Off. |
| 0640662 | 3/1995 | European Pat. Off. |

OTHER PUBLICATIONS

Derwent Abstract Corresponding to EPO 640662 (AN 95–092315).

*Primary Examiner*—Margaret W. Glass
*Attorney, Agent, or Firm*—Brooks & Kushman

[57] ABSTRACT

Novel crosslinkable compositions are described, comprising (A) organopolysiloxanes containing aliphatically unsaturated hydrocarbon radicals, comprising;

(a) at least one unit, per molecule, of the formula $$\begin{array}{c} A \\ | \\ A-Si-A, \\ | \\ B \end{array} \quad (I)$$

in which
A is a radical of the formula $$-(OSiR^1R^2)_z-(OSiR_2)_x-Y-SiR_2O_{1/2},$$

R is identical or different and is a monovalent, aliphatically saturated or aromatic hydrocarbon radical having 1 to 12 carbon atoms per radical,
$R^1$ is a radical of the formula $-OSiR_2-Y-SiR_2O_{1/2}$.
$R^2$ has the meaning of R, $R^1$ or R', where R' is a monovalent, aliphatically saturated or aromatic hydrocarbon radical having 1 to 12 carbon atoms per radical, which contains one or more heteroatoms chosen from the group consisting of O, S, N, Si and Ti.
Y is a divalent hydrocarbon radical of the formula $-CH_2CHR^5(-R^4)_v-$, in which
$R^4$ is a divalent hydrocarbon radical having 1 to 10 carbon atoms per radical or a chemical bond, if v has the value 0,
$R^5$ is a hydrogen atom or has the meaning of R,
v is 0 or 1,
x and z is identical or different and is 0 or 1,
and B has the meaning of A or R or R', with the proviso that B is R or R' if x is 0.

(b) at least one unit, per molecule, of the formula $O_{1/2}SiR_2R^3$ (II), in which
R has the meaning given above for this radical and $R^3$ is an aliphatically unsaturated hydrocarbon radical of the formula
$H_2C=CR^5(-R^4)_v-$, in which $R^4$ and $R^5$ have the meaning given above for these radicals.

8 Claims, No Drawings

CROSSLINKABLE COMPOSITIONS COMPRISING ORGANOPOLYSILOXANES CONTAINING ALIPHATICALLY UNSATURATED HYDROCARBON RADICALS

BRIEF SUMMARY OF INVENTION

The present invention relates to crosslinkable compositions comprising;

(A) an organopolysiloxane containing aliphatically unsaturated hydrocarbon radicals (B) an organopolysiloxane containing Si-bonded hydrogen atoms, (C) a catalyst which promotes the addition of Si-bonded hydrogen onto an aliphatic multiple bond, and optionally (D) an agent which delays the addition of Si-bonded hydrogen onto an aliphatic multiple bond at room temperature, and to the use of the crosslinkable compositions for the production of anti-adhesive coatings.

BACKGROUND OF THE INVENTION

EP 0403890 B1 (Bayer A G; published on Mar. 16, 1994) and corresponding U.S. Pat. No. 5,077,369, and EP 0640662 A2 (Bayer A G; published on Mar. 1, 1995) describe addition-crosslinking organopolysiloxane mixtures for the production of adhesion-reducing coatings. The organopolysiloxanes contained in the mixtures are branched, the branching sites being trifunctional monoorganosiloxy groups, called T units, or tetrafunctional siloxy groups, called Q units. Furthermore they have triorganosiloxy groups, called M units, as end groups which contain at least one unsaturated hydrocarbon radical. The organopolysiloxanes are prepared by hydrolysis of chlorosilanes and subsequent polymerization with low molecular weight cyclic diorganopolysiloxanes. Since the T units and Q units do not obey the same kinetics as the D units (diorganosiloxane units) and M units, it is difficult to achieve controlled distribution of the branching sites in the polymer and to establish a defined average distance between these units.

U.S. Pat. No. 4,772,515 (Shin-Etsu Chemical Co.; issued on Sep. 20, 1988) also claims addition-crosslinking organopolysiloxane mixtures for the production of anti-adhesive organopolysiloxane coatings. The organopolysiloxanes contained have at least two branching sites in the form of T units per molecule, and the M units containing alkenyl groups are bonded to the T units via D units. The organopolysiloxanes are prepared by reaction of alkyltrimethoxysilanes with octamethylcyclotetrasiloxane in the presence of a basic catalyst, subsequent hydrolysis and reaction with alkenyldisiloxanes.

Polysilethylenesiloxanes with alternating siloxane-carbo structures are known from U.S. Pat. No. 5,087,720 (Shin-Etsu Chemical Co.; issued on Feb. 11, 1992). The polymers are not branched, have exclusively disiloxy groups between the carbo units and contain only two terminal Si-bonded vinyl groups.

U.S. Pat. No. 5,082,915 (Shin-Etsu Chemical Co., Ltd.; issued on Jan. 21, 1992) describes paper-coating compositions which comprise an organopolysiloxane with at least two Si-bonded alkenyl groups and at least one Si-bonded radical of the formula —(CH$_2$)$_m$—(R$^1_2$SiO)$_n$—SiR$^1_3$, in which R$^1$ is a monovalent hydrocarbon radical, preferably a methyl radical, m is an integer from 2 to 8 and n is an integer from 5 to 100.

The SiC-bonded siloxane side chain in the branched organopolysiloxane is obtained by reaction of a linear organopolysiloxane having a lateral Si-bonded alkenyl group, preferably an Si-bonded vinyl group, with a linear organopolysiloxane having an Si-bonded hydrogen atom at one end and Si-bonded saturated hydrocarbon radicals, preferably methyl radicals, at the other end in the presence of a hydrosilylation catalyst. The monofunctional organopolysiloxanes containing Si-bonded hydrogen atoms which are required can be prepared only in an expensive manner and therefore uneconomically.

U.S. Pat. No. 5,581,008 (Dow Corning Toray Silicone Co., issued on Dec. 3, 1996) describes a process for the preparation of branched organosilicon compounds.

The object of the present invention is to provide organopolysiloxanes which contain aliphatically unsaturated hydrocarbon radicals, which are prepared in a simple process which should not contain large amounts of starting materials, which should be branched and contain the aliphatically unsaturated hydrocarbon radicals exclusively in the chain ends, which are obtainable with low viscosities, and rapidly crosslink with organopolysiloxanes containing Si-bonded hydrogen atoms in the presence of catalysts promotes the addition of Si-bonded hydrogen onto an aliphatic multiple bond. Furthermore, the object of the present invention is to provide crosslinkable compositions which are suitable for the production of anti-adhesive coatings.

DETAILED DESCRIPTION OF THE INVENTION

The present invention relates to a crosslinkable composition comprising:

(A) an organopolysiloxane containing aliphatically unsaturated hydrocarbon radicals (B) an organopolysiloxane containing Si-bonded hydrogen atoms (C) a catalyst which promote the addition of Si-bonded hydrogen onto an aliphatic multiple bond and, optionally, (D) agents which delay the addition of Si-bonded hydrogen onto an aliphatic multiple bond at room temperature, wherein the (A) organopolysiloxane containing aliphatically unsaturated hydrocarbon radicals are those containing (a) at least one unit, per molecule, of the formula

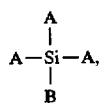  (I)

in which A is a radical of the formula

R is identical or different and is a monovalent, aliphatically saturated or aromatic hydrocarbon radical having 1 to 12 carbon atoms per radical, R$^1$ is a radical of the formula

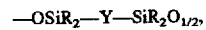

R$^2$ has the meaning of R, R$^1$ or R', where R' is a monovalent, aliphatically saturated or aromatic hydrocarbon radical having 1 to 12 carbon atoms per radical, which contains one or more heteroatoms chosen from the group consisting of O, S, N, Si and Ti, Y is a divalent hydrocarbon radical of the formula $$—CH_2CHR^5(—R^4)_v—,$$

$R^4$ is a divalent hydrocarbon radical having 1 to 10 carbon atoms per radical or a chemical bond, if v has the value 0, $R^5$ is a hydrogen atom or has the meaning of R, v is 0 or 1, x is 0 or 1 and z is 0 or 1, and B has the meaning of A or R or R', with the proviso that B is R or R' if x is 0, (b) at least one unit, per molecule, of the formula $$O_{1/2}SiR_2R^3 \qquad (II),$$

in which R has the meaning given above and $R^3$ is an aliphatically unsaturated hydrocarbon radical of the formula $$H_2C=CR^5(—R^4)_v—,$$

in which $R^4$ and $R^5$ have the meaning given above, (c) optionally units of the formula $$O_{1/2}SiR_3 \qquad (III),$$

in which R has the meaning given above, (d) optionally units of the formula $$SiR_2O \qquad (IV),$$

in which R has the meaning given above for this radical, and (e) optionally units of the formula $$O_{1/2}SiR_2—Y—SiR_2O_{1/2} \qquad (V),$$

in which R has the meaning given above.

The present invention furthermore relates to crosslinkable compositions, wherein the (A) organopolysiloxanes containing aliphatically unsaturated hydrocarbon radicals used are those which can be prepared by reacting, in a first step, compounds (1) of the formula $$\begin{array}{c} C \\ | \\ C—Si—C \\ | \\ D \end{array}$$

in which C is a radical of the formula $$—(OSiR^6R^7)_z(OSiR_2)_xH$$

in which x and z have the meaning given above, $R^6$ is a radical of the formula $$—OSiR_2H$$

and $R^7$ has the meaning of R, R' or $R^6$, where R and R' have the meaning given above, and D has the meaning of C or R or R', with the proviso that D is R or R' if x is 0, and, optionally, compounds (2) of the formula $$HR_2SiO(R_2SiO)_nSiR_2H$$

in which R has the meaning given above and n is 0 or an integer having a value from 1 to 100, with organo(poly)siloxanes (3) of the formula $$R^3R_2SiO(R_2SiO)_mSiR_2R^3$$

in which R and $R^3$ have the meaning given above and m is 0 or an integer having a value from 1 to 200, and excess organo(poly)siloxanes (3) are removed by distillation, in the presence of catalysts (4) which promote the addition of an aliphatic double bond onto Si-bonded hydrogen, the ratio used of aliphatic double bond in organo(poly)siloxane (3) to Si-bonded hydrogen in compounds (1) and (2) being 1.3 to 5.0, and, optionally, in a second step, equilibrating the organopolysiloxanes containing aliphatically unsaturated hydrocarbon radicals thus obtained with organopolysiloxanes (5) chosen from the group consisting of linear organopolysiloxanes containing terminal triorganosiloxy groups and linear organopolysiloxanes containing terminal hydroxyl groups.

The organopolysiloxanes according to the invention containing aliphatically unsaturated hydrocarbon radicals are both polymeric and oligomeric siloxanes.

The organopolysiloxanes according to the invention contain on average at least two units of formula (II) per molecule, preferably at least three units of formula (II) per molecule.

The organopolysiloxanes according to the invention preferably contain a number of trifunctional (T) and/or tetrafunctional (Q) units of formula (I) and a number (X) of units of formula (II) which contain aliphatically unsaturated hydrocarbon radicals which are determined by the equations (i), (ii) and (iii)

(i) units of formula (I) where B=R or R', in the case of trifunctional units: $(T+1) \leq X \leq (T+2)$ (ii) only units of the formula (I) where B=A, in the case of tetrafunctional units: $(2Q+1) \leq X \leq (2Q+2)$ (iii) units where B=R or R' and B=A, in the case of trifunctional and tetrafunctional units: $(T+2Q+1) \leq X \leq (T+2Q+2)$ in which T is a number from 0 to 10, Q is a number from 0 to 5 and the sum of T+Q is a number from 1 to 10.

The organopolysiloxanes according to the invention containing aliphatically unsaturated hydrocarbon radicals have a viscosity of from 20 to 20,000 mm²/s at 25° C., preferably 20 to 1,000 mm²/s at 25° C., more preferably 20 to 500 mm²/s at 25° C.

The organopolysiloxanes according to the invention have iodine numbers between 2 and 20, preferably 4 and 15, the iodine number indicating the amount of iodine consumed, in grams per 100 grams of organopolysiloxane according to the invention used during the addition onto the double bond.

Examples of the radical R are alkyl radicals, such as the methyl, ethyl, n-propyl, iso-propyl, n-butyl, iso-butyl, tert-butyl, n-pentyl, iso-pentyl, neo-pentyl and the tert-pentyl radical, hexyl radicals, such as the n-hexyl radical, heptyl radicals, such as the n-heptyl radical, octyl radicals, such as the n-octyl radical and iso-octyl radicals, such as the 2,2,4-trimethylpentyl and the 2-ethylhexyl radical, nonyl radicals, such as the n-nonyl radical, decyl radicals, such as the n-decyl radical, dodecyl radicals, such as the n-dodecyl radical, tetradecyl radicals, such as the n-tetradecyl radical, hexadecyl radicals, such as the n-hexadecyl radical, and octadecyl radicals, such as the n-octadecyl radical, cycloalkyl radicals, such as the cyclopentyl, cyclohexyl and 4-ethylcyclohexyl radical, cycloheptyl radicals, norbornyl radicals and methylcyclohexyl radicals, aryl radicals, such as the phenyl, biphenyl, naphthyl and anthryl and phenanthryl radical, alkaryl radicals, such as o-, m- and p-tolyl radicals, xylyl radicals and ethylphenyl radicals, and aralkyl radicals, such as the benzyl radical and the α- and the β-phenylethyl radical.

The radical R is preferably the methyl radical.

Examples of radicals R' are the 2-methoxyethyl and the 2-ethoxyethyl radical, the 2-triethylsilylethyl radical, the 3-diethylaminopropyl radical and the 4,4-dimethyl-4-silaheptyl radical.

Examples of radicals Y are those of the formula —$CH_2CH_2$—, —$CH(CH_3)$—, —$(CH_2)_4$—, —$(CH_2)_5$—, —$(CH_2)_6$—, —$(CH_2)_8$—, —$(CH_2)_{10}$—, and —$(CH_2)_{12}$—, where the radicals of the formula —$CH_2CH_2$—, —CH($CH_3$)—, —$(CH_2)_6$— and —$(CH_2)_8$— are preferred and the radical of the formula —$CH_2CH_2$— is more preferred.

Examples of radicals $R^3$ are the vinyl, allyl, 3-butenyl, 5-hexenyl, 7-octenyl, 9-decenyl and the 11-dodecenyl radical, where the vinyl and the 5-hexenyl radical are preferred and the vinyl radical is more preferred.

x is preferably 1.

z is preferably 0.

m is 0 or an integer from 1 to 40, preferably 0 or an integer from 1 to 30.

Examples of compounds (1) are octylsilane, dodecylsilane, phenylsilane, methyl-tris(dimethylsiloxy)silane, methyl-tris(diethylsiloxy)silane, n-propyl-tris(dimethylsiloxy)silane, n-octyl-tris(dimethylsiloxy)silane, phenyl-tris(dimethylsiloxy)silane, tetrakis(dimethylsiloxy)silane, 1,3-dipropyl-1,1,3,3-tetrakis(dimethylsiloxy)disiloxane and 1,3-diphenyl-1,1,3,3-tetrakis(dimethylsiloxy)disiloxane.

Examples of compounds (2) which are co-used, optionally, are 1,1,3,3-tetramethyldisiloxane, 1,1,3,3,5,5,9,9-octamethyltetrasiloxane and 1,1,3,3,5,5,9,9,11,11,13,13,15,15tetradecamethylheptasiloxane.

In the process according to the invention, the amount of compound (2)used, optionally, is such that the Si-bonded hydrogen in compound (2) is less than 75%, preferably less than 60%, of the Si-bonded hydrogen used in total.

Examples of organo(poly)siloxanes (3) are 1,3-divinyl-1,1,3,3-tetramethyldisiloxane, copolymers of vinyldimethylsiloxane and dimethylsilox-ane units and copolymers of 5-hexenyldimethylsiloxane and dimethylsiloxane units.

In the first process step of the process according to the invention, one type of compound (1) or various types of compounds (1) can be used.

In the first process step of the process according to the invention, one type of organo(poly)siloxane (3) or various types of organo(poly)siloxane (3) can be used.

In the first step of the process according to the invention, the ratio of aliphatic double bond in organo(poly)siloxane (3) to Si-bonded hydrogen in compounds (1) and (2) is 1.5 to 3.0, preferably 1.6 to 2.5.

The process according to the invention has the advantage that organopolysiloxanes which have low viscosities, are branched and have aliphatically unsaturated hydrocarbon radicals exclusively on the chain ends are obtained. In contrast, polyaddition reactions by reaction of linear organopolysiloxanes having several Si-bonded hydrogen atoms in the form of HRSiO units with linear organopolysiloxanes having Si-bonded vinyl groups at a C=C/Si-H ratio of 2.0 or less usually give products with extremely high viscosities, which means that they can no longer be used in practice, since comparatively low viscosities are necessary for coating applications.

The same catalysts which have been used to date for promoting the addition of Si-bonded hydrogen onto an aliphatic multiple bond can be used in the process according to the invention as catalysts (4) which promote the addition of Si-bonded hydrogen onto an aliphatic multiple bond. The catalyst (4) is preferably a metal from the group of platinum metals or a compound or a complex from the group of platinum metals. Examples of such catalysts are metallic and finely divided platinum, which can be on supports, such as silicon dioxide, aluminum oxide or active charcoal, and compounds or complexes of platinum, such as platinum halides, for example $PtCl_4$, $H_2PtCl_6*6H_2O$, $Na_2PtCl_4*4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6*6H_2O$ and cyclohexanone, platinum-vinylsiloxane complexes, such as platinum-1,3divinyl-1,1,3,3-tetramethyldisiloxane complexes, with or without a content of detectable inorganically bonded halogen, bis-(gamma-picoline)-platinum dichloride, trimethylenedipyridineplatinum dichloride, dicyclo-pentadieneplatinum dichloride, dimethyl sulfoxide-ethyleneplatinum-(II) dichloride, cyclooctadiene-platinum dichloride, norbornadiene-platinum dichloride, gamma-picoline-platinum dichloride, cyclopentadiene-platinum dichloride, and reaction products of platinum tetrachloride with olefin and primary amine or secondary amine or primary and secondary amine according to U.S. Pat. No. 4,292,434, such as the reaction product of platinum tetrachloride, dissolved in 1-octene, with sec-butylamine, or ammonium-platinum complexes according to EP-B 110 370.

The catalyst (4) is used in the first process step in amounts of 0.1 to 50 ppm by weight (parts by weight per million parts by weight), preferably in amounts of 0.5 to 5 ppm by weight, calculated as elemental platinum and based on the total weight of the compounds (1) and (2) and organo(poly)siloxanes (3).

The first process step is carried out under the pressure of the surrounding atmosphere, at about 1020 hPa (absolute), however, it can also be carried out under higher or lower pressures. The first process step is carried out at a temperature of 50° C. to 150° C., preferably 80° C. to 120° C.

Inert organic solvents can be co-used in the first process step, although the co-use of inert organic solvents is not preferred. Examples of inert organic solvents are toluene, xylene, octane isomers, butyl acetate, 1,2-dimethoxyethane, tetrahydrofuran and cyclohexane.

The inert organic solvents co-used optionally are removed by distillation after the first process step.

The first process step is carried out either by a procedure in which components (1), optionally (2), (3) and (4) are mixed homogeneously at room temperature and then brought to the reaction temperature, or by initially introducing components (3) and (4) into the reaction vessel together and, after heating them to the reaction temperature, metering in component (1) and, optionally, (2).

In the first process step, the hydrosilylation, a conversion of more than 95%, preferably more than 99% of the Si-bonded hydrogen atoms is achieved.

The organopolysiloxanes according to the invention still contain residual amounts of organo(poly)siloxanes (3).

Residual amounts of organo(poly)siloxanes (3) where m is 0 or an integer from 1 to 5 are removed by distillation. Organo(poly)siloxanes (3) where m is greater than 5 cannot be removed by distillation and remain in the product. The organopolysiloxanes obtained by the process according to the invention can therefore comprise organo(poly)siloxanes (3) in amounts of 0% to 30% by weight, preferably 0% to 20% by weight.

The organopolysiloxanes containing unsaturated hydrocarbon radicals obtained in the first process step can be equilibrated with organopolysiloxane (5) in a second process step.

During the equilibration, the formation of rings without functional groups, which is known to the expert and which are present in amounts of 8% to 15% by weight, is unavoidable but does not cause trouble. Optionally, volatile contents thereof (rings with 3–9 Si atoms) can be removed from the product mixture by distillation under vacuum and at higher temperatures. Like the rings, small amounts of other by-products which are not desired but cause no trouble can be obtained during the equilibration.

Organopolysiloxanes (5) which are chosen are those from the group consisting of linear organopolysiloxanes containing terminal triorganosiloxy groups, of the formula

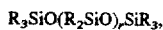
$$R_3SiO(R_2SiO)_rSiR_3,$$

in which

R has the meaning given above and r is 0 or an integer having a value from 1 to 1,000, preferably 100 to 400, and linear organopolysiloxanes containing terminal hydroxyl groups, of the formula

$$HOR_2SiO(SiR_2O)_rSiR_2OH,$$

in which R and r have the meaning given above for this radical and index.

The ratio of the amounts of the organopolysiloxanes (5) used in the equilibration carried out, optionally, and organopolysiloxanes containing aliphatically unsaturated hydrocarbon radicals is determined merely by the desired proportion of the aliphatically unsaturated hydrocarbon radicals in the organopolysiloxanes produced during the equilibration carried out, optionally, and by the desired average chain length.

Basic or acid catalysts which promote the equilibration are used in the optional equilibration. Examples of basic catalysts are alkali metal hydroxides, such as sodium hydroxide and potassium hydroxide, trimethylbenzylammonium hydroxide and tetramethylammonium hydroxide. Alkali metal hydroxides are preferred. Alkali metal hydroxides are preferably used in amounts of 50 to 10,000 ppm by weight (=parts per million), in particular 500 to 2,000 ppm by weight, in each case based on the total weight of the organopolysiloxanes containing aliphatically unsaturated hydrocarbon radicals and organopolysiloxanes (5)used.

Examples of acid catalysts are sulfuric acid, phosphoric acid, trifluoromethanoic acid, phosphonitrile chlorides and acid catalysts which are solid under the reaction conditions, such as acid-activated bleaching earth, acid zeolites, sulfonated charcoal and sulfonated styrene/divinylbenzene copolymer. Phosphonitrile chlorides are preferred. Phosphonitrile chlorides are used in amounts of 5 to 1000 ppm by weight (=parts per million), in particular 50 to 200 ppm by weight, in each case based on the total weight of the organopolysiloxanes containing aliphatically unsaturated hydrocarbon radicals used and organopolysiloxanes (5) used.

The equilibration carried out, optionally, is carried out at 100° C. to 150° C. under the pressure of the surrounding atmosphere, at about 1020 hPa (absolute). If desired, however, higher or lower pressures can also be applied. The equilibration is carried out in 5% to 20% by weight, based on the total weight of the particular organopolysiloxanes containing aliphatically unsaturated hydrocarbons used and organopolysiloxanes (5) used, of water-immiscible solvent, such as toluene. Before working up the mixture obtained during the equilibration, the catalyst can be rendered inactive.

The process according to the invention can be carried out batchwise, semicontinuously or completely continuously.

The organopolysiloxanes according to the invention containing aliphatically unsaturated hydrocarbon radicals can be crosslinked with organopolysiloxanes containing Si-bonded hydrogen in the presence of hydrosilylation catalysts. The organopolysiloxanes according to the invention containing aliphatically unsaturated hydrocarbon radicals can also be crosslinked with organic polymers containing mercapto groups.

The crosslinkable compositions comprising the organopolysiloxanes according to the invention containing aliphatically unsaturated hydrocarbons are used for the production of anti-adhesive coatings, for example for the production of release papers.

The self-adhesive materials joined to the release paper are produced by the off-line process or the in-line process. In the off-line process, the silicone composition is applied to the paper and crosslinked, and a film of adhesive, which, for example, lies on a label face paper, is then applied to the coated paper in a subsequent stage, usually after the release paper has been wound onto a roll and after the roll has been stored, and the laminate is then pressed together. In the in-line process, the silicone composition is applied to the paper and crosslinked, the silicone coating is coated with the adhesive, the label face paper is then applied to the adhesive and the laminate is finally pressed together.

One type of organopolysiloxane (A) or various types of organopolysiloxane (A) can be used in the compositions according to the invention.

The same organopolysiloxanes containing Si-bonded hydrogen atoms which it has been possible to use in all the compositions known to date of organopolysiloxanes containing aliphatically unsaturated hydrocarbon radicals, such as vinyl groups, organopolysiloxanes containing Si-bonded hydrogen atoms and catalysts which promote the addition of Si-bonded hydrogen onto an aliphatic multiple bond can also be used as constituent (B) in the compositions according to the invention.

The organopolysiloxanes (B) preferably contain at least three Si-bonded hydrogen atoms.

Organopolysiloxanes which are used as constituent (B) are those of units of the formula

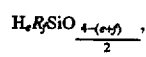
$$H_eR_fSiO_{\frac{4-(e+f)}{2}},$$

in which

R has the meaning given above, e is 0 or 1, f is 0, 1, 2 or 3 and the sum e+f is not greater than 3, preferably those of the formula

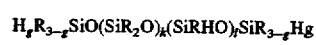
$$H_fR_{3-f}SiO(SiR_2O)_k(SiRHO)_rSiR_{3-f}H_g$$

in which

R has the meaning given above, g is 0 or 1, k is 0 or an integer from 1 to 100 and l is 0 or an integer from 1 to 100, or organosilicon compounds containing Si-bonded hydrogen atoms such as are described in German application 196 02 663.6 and corresponding U.S. application, Ser. No. 08/782,871, filed Jan. 14,1997, by Wacker-Chemie GmbH, Munich, Germany, or mixtures of the above mentioned organopolysiloxanes and organosilicon compounds.

Examples of organopolysiloxanes (B) are, in particular, copolymers of dimethylhydridosiloxane, methylhydridosiloxane, dimethylsiloxane and trimethylsiloxane units, copolymers of trimethylsiloxane, dimethylhydridosiloxane and methylhydridosiloxane units, copolymers of trimethylsiloxane, dimethylsiloxane and methylhydridosiloxane units, copolymers of methylhydridosiloxane and trimethylsiloxane units, copolymers of methylhydridosiloxane, diphenylsiloxane and trimethylsiloxane units, copolymers of methylhydridosiloxane, dimethylhydridosiloxane and diphenylsiloxane units, copolymers of methylhydridosiloxane, phenylmethylsiloxane, trimethylsiloxane and/or dimethylhydridosiloxane units, copolymers of methylhydridosiloxane, dimethylsiloxane, diphenylsiloxane, trimethylsiloxane and/or dimethylhydridosiloxane units, and copolymers of dimethylhydridosiloxane, trimethylsiloxane, phenylhydridosiloxane, dimethylsiloxane and/or phenylmethylsiloxane units.

Processes for the preparation of organopolysiloxanes (B), including those organopolysiloxanes (B) of the preferred type, are generally known.

Organosilicon compounds (B) are used in amounts of 0.5 to 6, preferably 1 to 3, more preferably 1.5 to 2.5 gram atoms of Si-bonded hydrogen per mole of radical $R^3$ in the organopolysiloxanes (A) containing aliphatically unsaturated hydrocarbon radicals.

The same catalysts which have been used, for promoting crosslinking, in the compositions known to date for crosslinking organosilicon compounds containing aliphatic multiple bonds with compounds which contain Si-bonded hydrogen can also be used in the compositions according to the invention as catalysts (C) which promote the addition of Si-bonded hydrogen onto an aliphatic multiple bond. The above mentioned catalysts (4) are preferably used as constituent (C).

Catalyst (C) is used in amounts of 5 to 500 ppm by weight (parts by weight per million parts by weight), in particular 10 to 200 ppm by weight, in each case calculated as elemental platinum metal and based on the total weight of the organopolysiloxanes (A) and (B).

All the inhibitors which have been used to date for the same purpose can also be used, optionally, in the compositions according to the invention as agents which delay the addition of Si-bonded hydrogen onto an aliphatic multiple bond at room temperature, so-called inhibitors (D). Examples of inhibitors are 1,3-divinyl-1,1,3,3-tetramethyldisiloxane, benzotriazole, dialkylformamides, alkylthioureas, methyl ethyl ketoxime, organic or organosilicon compounds having a boiling point of at least 25° C. under 1012 mbar (absolute) and at least one aliphatic triple bond, according to U.S. Pat. No. 3,445,420, such as 1-ethynylcyclohexan-1-ol, 2-methyl-3-butyn-2-ol, 3-methyl-1-pentyn-3-ol, 2,5-dimethyl-3-hexyne-2,5-diol, 3,5-dimethyl-1-hexyn-3-ol and 3,7-dimethyl-oct-1-yn-6-en-3-ol, inhibitors according to U.S. Pat No. 2,476,166, such as a mixture of diallyl maleate and vinyl acetate, and inhibitors according to U.S. Pat. No. 4,504,645, such as maleic acid monoesters.

Inhibitor (D) is used in amounts of 0.001% to 10% by weight, based on the total weight of organopolysiloxanes (A) and (B).

Examples of further constituents which can be co-used in the compositions according to the invention are agents for establishing the separating force, solvents, adhesion promoters and pigments.

Examples of agents for establishing the separating force of the anti-adhesive coatings produced with the compositions according to the invention are silicone resins of units of the formula

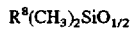

and

so-called MQ resins, in which $R^8$ is a hydrogen atom, a methyl radical or $R^3$ and the units of the formula $R^8(CH_3)_2SiO_{1/2}$ can be identical or different. The ratio of units of the formula $R^8(CH_3)_2SiO_{1/2}$ to units of the formula $SiO_2$ is preferably 0.6 to 2. The silicone resins are used in amounts of 5% to 80% by weight, based on the total weight of organopolysiloxanes (A) and (B).

The solvents optionally used in the compositions according to the invention can be the same solvents which have been used in the compositions known to date of organopolysiloxanes containing aliphatically unsaturated hydrocarbon radicals, organopolysiloxanes containing Si-bonded hydrogen and catalysts which promote the addition of Si-bonded hydrogen onto an aliphatic double bond. Examples of such solvents are benzines, for example alkane mixtures having a boiling range from 80° C. to 110° C. under 1012 mbar (absolute), n-heptane, benzene, toluene and xylenes, halogenated alkanes having 1 to 6 carbon atoms, such as methylene chloride, trichloroethylene and perchloroethylene, ethers, such as di-n-butyl ether, esters, such as ethyl acetate, and ketones, such as methyl ethyl ketone and cyclohexanone.

If organic solvents are co-used, they are used in amounts of 10% to 95% by weight, based on the weight of the organopolysiloxanes (A) containing aliphatically unsaturated hydrocarbon radicals.

Although the sequence in which constituents (A), (B), (C) and, optionally (D) are mixed is not decisive, in practice it has proven advantageous to add constituent (C), the catalyst, last to the mixture of the other constituents.

The crosslinking of the compositions according to the invention is carried out at 50° C. to 150° C. One advantage of the compositions according to the invention is that rapid crosslinking is achieved even at low temperatures. Sources of energy which are preferably used for the crosslinking by heating are ovens, for example circulating air drying cabinets, heating tunnels, heated rolls, heated plates or heat rays in the infrared range.

The compositions according to the invention can also be crosslinked by irradiation with ultraviolet light or by irradiation with UV and IR light, as well as by heating. The ultraviolet light used is usually that having a wavelength of 253.7 nm. A large number of lamps which emit ultraviolet light having a wavelength of 200 to 400 nm, and which preferably emit ultraviolet light having a wavelength of 253.7 nm, are commercially available.

The compositions according to the invention can be applied to the surfaces to be rendered anti-adhesive in any desired manner which is suitable for the production of coatings from liquid substances and is known in many cases, for example by dipping, brushing, pouring, spraying, rolling on, printing, for example by means of an offset gravure coating device, knife or doctor blade coating or by means of an airbrush.

The surfaces to be rendered anti-adhesive which can be treated in the context of the invention can be surfaces of any desired substances which are solid at room temperature under 1012 mbar (absolute). Examples of such surfaces are those of paper, wood, cork and films of plastic, for example polyethylene films or polypropylene films, woven and nonwoven cloth of naturally occurring or synthetic fibers or glass fibers, ceramic objects, glass, metals, paper coated with polyethylene and pasteboard, including that of asbestos. The above mentioned polyethylene can be high, medium or low pressure polyethylene. The paper can be lower quality grades of paper, such as absorbent papers, including untreated kraft paper, i.e. kraft paper which has not been pretreated with chemicals and/or polymeric natural substances, having a weight of 60 to 150 g/m$^2$, unsized papers, papers of low freeness value, wood-containing papers, nonsatinized or noncalendered papers, papers which are smooth on one side as a result of the use of a dry glazing cylinder during their production, without further expensive measures, and are therefore called "one-sided machine-smoothed papers", uncoated papers or papers produced from paper waste, or so-called waste papers. However, the paper to be treated according to the invention can also be high-quality grades of paper, such as low-absorbency papers, sized papers, papers of high freeness value, wood-free papers, calendered or satinized papers, glassine papers, parchmentized papers or precoated papers. The pasteboard can also be of high or lower quality.

The compositions according to the invention are suitable, for example, for the production of release, covering and interleaving papers, including interleaving papers which are used in the production of, for example, cast or decorative films or of foams, including those of polyurethane. The compositions according to the invention are furthermore suitable, for example, for the production of release, covering and interleaving pasteboard, films and cloths, for treatment of the reverse of self-adhesive tapes or self-adhesive films or of the written sides of self-adhesive labels. The compositions according to the invention are also suitable for the treatment of packaging material, such as that of paper, cardboard boxes, metal foils and drums, for example pasteboard, plastic, wood or iron, which is or are intended for storage and/or transportation of sticky goods, such as adhesives, sticky foodstuffs, for example cakes, honey, sweets and meat, bitumen, asphalt, greased materials and crude rubber. Another example of the use of the compositions according to the invention is the treatment of carriers for transfer of pressure-sensitive adhesive layers in the so-called "transfer process".

The compositions according to the invention are suitable for the production of the self-adhesive materials joined to the release paper both by the off-line process and by the in-line process.

Example 1

0.1 mg of Pt in the form of a 1% strength solution of Karstedt catalyst in vinylsiloxane polymer is added to 180 g of an α,ω-divinyldimethylpolysiloxane of average molecular weight ($M_n$) 1800 g/mol at 25° C. and 9.9 g of propyltris(dimethylsiloxy)silane are added. The Karstedt catalyst is a platinum-1,3-divinyl-1,1,3,3-tetramethyldisiloxane complex which, in the following, corresponds to the catalyst such as is prepared in accordance with U.S. Pat. No. 3,775,452 (issued on Nov. 27, 1973, Bruce D. Karstedt, General Electric Co.). The mixture is heated at 100° C. for about 1 hour. After consumption of all the Si-bonded hydrogen atoms, the mixture is cooled. The clear product has a viscosity of 190 mm$^2$/s at 25° C. and an iodine number of 13.8 (corresponds to about 543 meq. of C=C/kg). The iodine number is a measure of the content of aliphatic carbon-carbon multiple bond of the product and is the number which indicates how many g of iodine are bonded by 100 g of product analyzed.

Example 2

5.4 g of propyltris(dimethylsiloxy)silane and 3.2 g of 1,1,3,3-tetramethyldisiloxane are added to a mixture of 145 g of the α,ω-divinyldimethylpolysiloxane from Example 1 and 43 g of an α,ω-divinyldimethylpolysiloxane having a viscosity of 500 mm$^2$/s at 25° C., and the mixture is stirred thoroughly at 25° C. for about 10 minutes. 0.5 mg of Pt as Karstedt catalyst is then added and the mixture is heated slowly to about 100° C. and stirred for about 1 hour until the Si-bonded hydrogen atoms have been consumed completely. After cooling to 25° C., the polymeric product has a viscosity of 450 mm$^2$/s at 25° C. and an iodine number of 8.5 (corresponds to about 330 meq. of C=C/kg).

Example 3

0.4 mg of Pt as Karstedt catalyst is added to 201 g of an equilibrate of 1,3-divinyl-1,1,3,3-tetramethyldisiloxane and a dimethyldichlorosilane hydrolysis product of iodine number 21 at 25° C. and the mixture is heated to 80° C. A mixture of 5.2 g of propyltris(dimethylsiloxy)silane and 3.1 g of 1,1,3,3-tetramethyldisiloxane is metered into this reaction solution, this heating up by about 20° C. The polymeric mixture is kept at about 100° C. for an additional hour and volatile constituents are distilled off at about 160° C. under 3 hPa. The resulting polymer has a viscosity of 280 mm$^2$/s at 25° C. and an iodine number of 9.0 (corresponds to about 354 meq. of C=C/kg).

Example 4

223 g of an equilibrate of 1,3-divinyl-1,1,3,3-tetramethyldisiloxane and a hydrolysis product of dimethyldichlorosilane of iodine number 19 are mixed successively with 5.8 g of phenyltris(dimethylsiloxy)-silane, 3.1 g of 1,1,3,3-tetramethyldisiloxane and 0.5 mg of Pt as Karstedt catalyst at 25° C. On heating up, an exothermic reaction takes place, after which the internal temperature is kept at about 100° C. for 1 hour. Volatile constituents are then distilled off at 160° C. under 3 hPa. The vinyl polymer thus obtained has a viscosity at 25° C. of 290 mm$^2$/s and an iodine number of 8.6 (corresponds to about 339 meq. of C=C/kg).

Example 5

Example 4 is repeated with the change that instead of the 3.1 g of 1,1,3,3-tetramethyldisiloxane, 15.4 g of an α,ω-dihydrodimethylpolysiloxane with 0.30% by weight of Si-bonded hydrogen are now employed. After the same procedure and working up as in Example 4, a polymer having a viscosity of 310 mm²/s at 25° C. and an iodine number of 8.2 (corresponds to about 323 meq. of C=C/kg) is obtained.

Example 6

294 g of the equilibrate from Example 4 are mixed with 11.0 g of phenyltris(dimethylsiloxy)silane and 0.6 mg of Pt in the form of Karstedt catalyst at 25° C. After one hour at 100° C., all the Si-bonded hydrogen atoms have reacted. Volatile constituents are then distilled off at 160° C. under 3 hPa. A polymer having a viscosity of 320 mm²/s at 25° C. and an iodine number of 11.3 (corresponds to about 445 meq. of C=C/kg) is obtained.

Example 7

5.0 g of phenyltris(dimethylsiloxy)silane and 2.7 g of 1,1,3,3-tetramethyldisiloxane are mixed with 234 g of a linear dimethylpolysiloxane having a viscosity of 48 mm²/s at 25° C. and 90 mol % of vinyl and 10 mol % of methyl end groups at 25° C. After homogenization, 0.5 mg of platinum in the form of Karstedt catalyst, dissolved in vinylsiloxane polymer (1% of Pt) is added and the total mixture is then heated to 100° C. and stirred thoroughly at that temperature for about one hour. A colorless, clear polymer having a viscosity of 280 mm²/s and an iodine number of 6.6 (corresponds to 260 meq. of C=C/kg) is obtained. The ¹H NMR spectrum shows an M$^v$/M ratio of 78:22. (M$^v$=CH₂=CH(CH₃)₂SiO₁/₂ M=(CH₃)₃SiO₁/₂)

Example 8

The vinyl polymer from Example 4 is tested in respect of the rate of hardening in a coating composition. By mixing the constituents mentioned below, a coating composition A (vinyl polymer from Example 4) and a coating composition B, for comparison, are prepared:

| Coating composition (A) | 2000.00 g of star polymer (Example 4) |
| | 5.0 g of ethynylcyclohexanol |
| | 86.0 g of crosslinker V 24 |
| | 20.0 g of catalyst OL |
| Coating composition (B) | 2000.00 g of linear α,ω-divinyldimethylpoly-siloxane having a viscosity of 200 mm²/s at 25° C. |
| | 5.0 g of ethynylcyclohexanol |
| | 78.0 g of crosslinker V 24 |
| | 20.0 g of catalyst OL |

Crosslinker V 24 is a copolymer of trimethylsiloxane and methylhysiloxane units having a viscosity of 20 mm²/s at 25° C., and catalyst OL is a platinum catalyst, both being sales products of Wacker-Chemie GmbH, Burghausen/Germany. The coating compositions each have an SiH/C=C ratio of 2.0 and an inhibitor/Pt ratio of 40:1, and comprise 100 ppm of Pt (calculated as the metal). The gel times at 25° C. were in each case about 70 hours.

The coating compositions were each applied via a 5-roll applicator to super-calendered paper in a layer thickness of about 1.0 µm. The temperature of the drying oven (4.6 m tunnel length) is kept constant at 150° C.

| Web speed [ft/min] | Hardening time [sec.] | Maximum web temp. [°C.] | Hardening composition A | Hardening composition B |
| --- | --- | --- | --- | --- |
| 300 | 3.00 | 115 | + | + |
| 400 | 2.25 | 113 | + | + |
| 500 | 1.80 | 110 | + | + |
| 600 | 1.50 | 108 | + | (−) |
| 700 | 1.29 | 106 | + | − |
| 800 | 1.13 | 102 | + | − |
| 900 | 1.00 | 99 | (−) | − |
| 1000 | 0.90 | 96 | − | |

+ means good hardening, no abrasion, no greasy layer
(−) means hardening but slight greasy layer
− means no hardening It is clearly found that the coating composition according to the invention still hardens well even at a considerably higher web speed and therefore also a lower substrate temperature, compared with the coating composition with the linear polymer.

Example 9

Coating compositions A and B from Example 8 are now compared at a constant web speed but at different temperatures. The web speed is generally 300 ft/min., which means a hardening time of 3.0 secs.

| Oven temperature [°C.] | Maximum web temperature [°C.] | Hardening composition A | Hardening composition B |
| --- | --- | --- | --- |
| 116 | 98 | + | + |
| 100 | 94 | + | (−) |
| 104 | 92 | + | − |
| 99 | 89 | + | − |
| 93 | 87 | − | − |

The formulation according to the invention can be hardened completely at significantly lower temperatures.

Example 10

Karstedt catalyst (corresponding to 6 mg of platinum) is added to 588 g of 1,3-divinyltetramethyldisiloxane and the mixture is heated to 138° C. A total of 336 g of phenyltris(dimethylsiloxy)silane are metered in over a period of 1 hour, the bottom temperature rising constantly to 156° C. To bring the conversion of active hydrogen to completion, the reaction mixture is kept at 140° C. for a further 2 hours. The excess disiloxane is removed in vacuo, after which 747 g of a clear oil which has a viscosity of 111 mm²/s at 25° C. and contains 2.02 mol of vinyl groups per kg are obtained. The conversion of the active hydrogen groups is 99.6%.

88 g of the product obtained above are equilibrated together with 440 g of a polydimethylsiloxane with trimethylsiloxy end groups of viscosity 342 mm²/s at 25° C. and 50 mg of PNCl₂ catalyst at 142° C. for 2 hours. The catalyst is deactivated by 10 g of MgO at 25° C. Filtration and removal of volatile product constituents at 160° C./3 hPa give a clear oil having a viscosity of 240 mm²/s at 25° C. and a vinyl group concentration of 0.30 mol per kg.

What is claimed is:

1. A crosslinkable composition comprising (A) an organopolysiloxane containing aliphatically unsaturated hydrocarbon radicals, (B) an organopolysiloxane containing Si-bonded hydrogen atoms, (C) a catalyst which promotes the addition of Si-bonded hydrogen onto an aliphatic multiple bond and, optionally, (D) an agent which delays the addition of Si-bonded hydrogen onto an aliphatic multiple bond at room temperature, wherein the organopolysiloxane (A) containing aliphatically unsaturated hydrocarbon radicals, comprises;

(a) at least one unit, per molecule, of the formula $$\begin{array}{c} A \\ | \\ A-Si-A, \\ | \\ B \end{array} \quad (I)$$

in which A is a radical of the formula $$-(OSiR^1R^2)_z-(OSiR_2)_x-Y-SiR_2O_{1/2},$$

R is identical or different and is a monovalent, aliphatically saturated or aromatic hydrocarbon radical having 1 to 12 carbon atoms per radical, $R^1$ is a radical of the formula $$-OSiR_2-Y-SiR_2O_{1/2},$$

$R^2$ has the meaning of R, $R^1$ or R', where R' is a monovalent, aliphatically saturated or aromatic hydrocarbon radical having 1 to 12 carbon atoms per radical, which contains one or more heteroatoms chosen from the group consisting of O, S, N, Si and Ti, Y is a divalent hydrocarbon radical of the formula $$-CH_2CHR^5(-R^4)_v-,$$

$R^4$ is a divalent hydrocarbon radical having 1 to 10 carbon atoms per radical or a chemical bond, if v has the value 0, $R^5$ is a hydrogen atom or has the meaning of R, v is 0 or 1, x is identical or different and is 0 or 1 and z is identical or different and is 0 or 1, and B has the meaning of A or R or R', with the proviso that B is R or R' if x is 0, (b) at least one unit, per molecule, of the formula $$O_{1/2}SiR_2R^3 \quad (II),$$

wherein

R has the meaning given above and $R^3$ is an aliphatically unsaturated hydrocarbon radical of the formula $$H_2C=CR^5(-R^4)_v-,$$

in which $R^4$ and $R^5$ have the meaning given above, (c) optionally units of the formula $$O_{1/2}SiR_3 \quad (III),$$

in which

R has the meaning given above, (d) optionally units of the formula $$SiR_2O \quad (IV),$$

in which

R has the meaning given above, and (e) optionally units of the formula $$O_{1/2}SiR_2-Y-SiR_2O_{1/2} \quad (V),$$

in which

R has the meaning given above.

2. A crosslinkable composition as claimed in claim 1, wherein the radical $R^3$ is a vinyl radical.

3. A crosslinkable composition as claimed in claim 1, wherein Y is a radical of the formula $-CH_2CH_2-$.

4. A crosslinkable composition as claimed in claim 1, wherein x is 1 and z is 0.

5. A crosslinkable composition comprising (A) an organopolysiloxane containing aliphatically unsaturated hydrocarbon radicals, (B) an organopolysiloxane containing Si-bonded hydrogen atoms, (C) a catalyst which promote the addition of Si-bonded hydrogen onto an aliphatic multiple bond and, optionally, (D) an agent which delays the addition of Si-bonded hydrogen onto an aliphatic multiple bond at room temperature, wherein the organopolysiloxane (A) containing aliphatically unsaturated hydrocarbon radicals is prepared by reacting, in a first step, compounds (1) of the formula $$\begin{array}{c} C \\ | \\ C-Si-C \\ | \\ D \end{array}$$

in which C is a radical of the formula $$-(OSiR^6R^7)_z(OSiR_2)_xH$$

in which x is identical or different and is 0 or 1 and z is identical or different and is 0 or 1, $R^6$ is a radical of the formula $$-OSiR_2H$$

and $R^7$ has the meaning of R, R' or $R^6$, in which R is identical or different and is an aliphatically saturated or aromatic hydrocarbon radical having 1 to 12 carbon atoms per radical and R' is a monovalent aliphatically saturated or aromatic hydrocarbon radical having 1 to 12 carbon atoms per radical, which contains one or more heteroatoms chosen from the group consisting of O, S, N, Si and Ti, and D has the meaning of C or R or R', with the proviso that D is R or R' if x is 0, and, optionally, compounds (2) of the formula $$HR_2SiO(R_2SiO)_nSiR_2H$$

in which

R is identical or different and has an aliphatically saturated or aromatic hydrocarbon radical having 1 to 12 carbon atoms per radical and n is 0 or an integer having a value from 1 to 100, with organo(poly)siloxanes (3) of the formula $$R^3R_2SiO(R_2SiO)_mSiR_2R^3$$

in which

R has the meaning given above for this radical and $R^3$ is an aliphatically unsaturated hydrocarbon radical of the formula $$H_2C=CR^5(-R^4)_v-$$

in which $R^4$ is a divalent hydrocarbon radical having 1 to 10 carbon atoms per radical or a chemical bond, if v has the value 0, and $R^5$ is a hydrogen atom or has the meaning of R, and m is 0 or an integer having a value from 1 to 200, in the presence of a catalyst (4) which promotes the addition of an aliphatic double bond onto Si-bonded hydrogen, the ratio of aliphatic double bond in organo(poly)siloxane (3) to Si-bonded hydrogen in compounds (1) and (2) being 1.3 to 5.0, and, optionally, in a second step, equilibrating the organopolysiloxanes containing aliphatically unsaturated hydrocarbon radicals thus obtained with organopolysiloxanes (5) chosen from the group consisting of linear organopolysiloxanes containing terminal triorganosiloxy groups and linear organopolysiloxanes containing terminal hydroxyl groups.

6. An anti-adhesive coating, comprising; the crosslinkable composition as claimed in claim 1.

7. A crosslinked composition prepared from the composition as claimed in claim 1.

8. A process for preparing an anti-adhesive surface, comprising;

A. applying a composition as claimed in claim 1 to a substrate, and

B. crosslinking the composition.

* * * * *